Aug. 11, 1953 A. J. BERANEK ET AL 2,648,186
TRACTOR-MOUNTED WINDROWER
Filed March 27, 1951 4 Sheets-Sheet 3
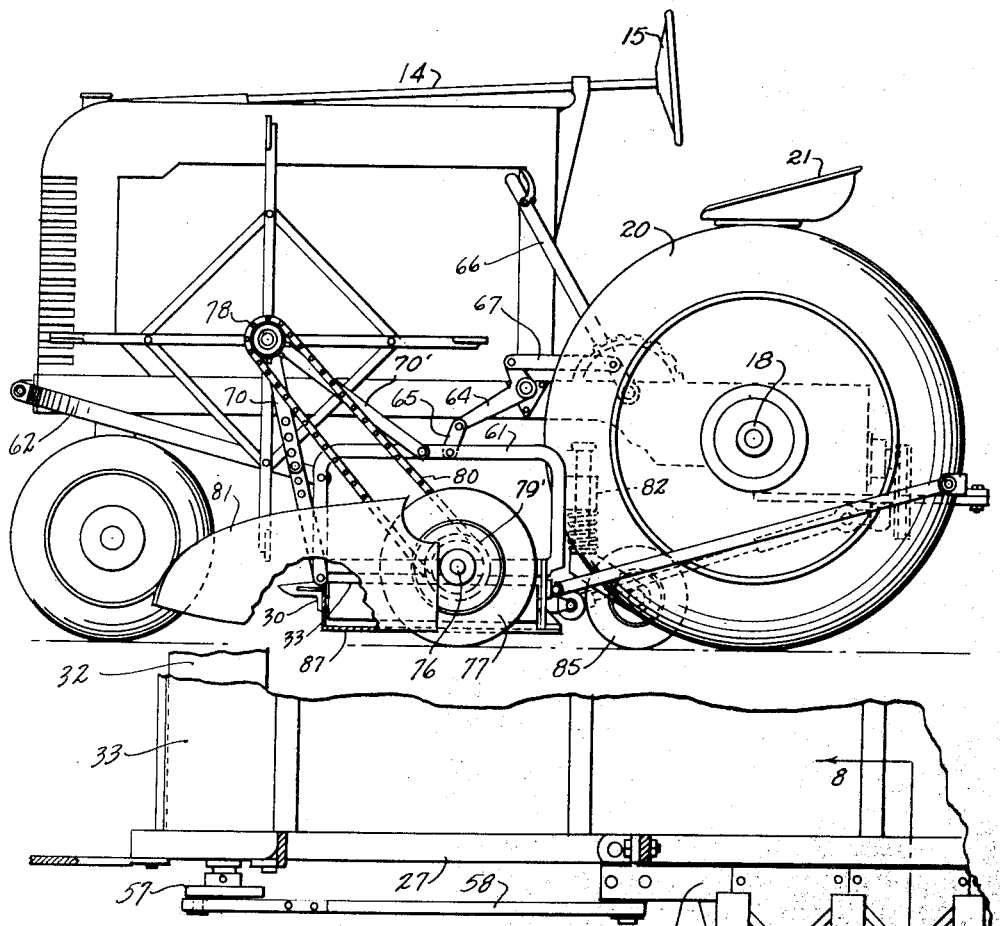
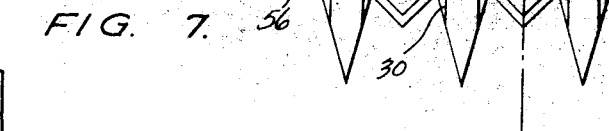
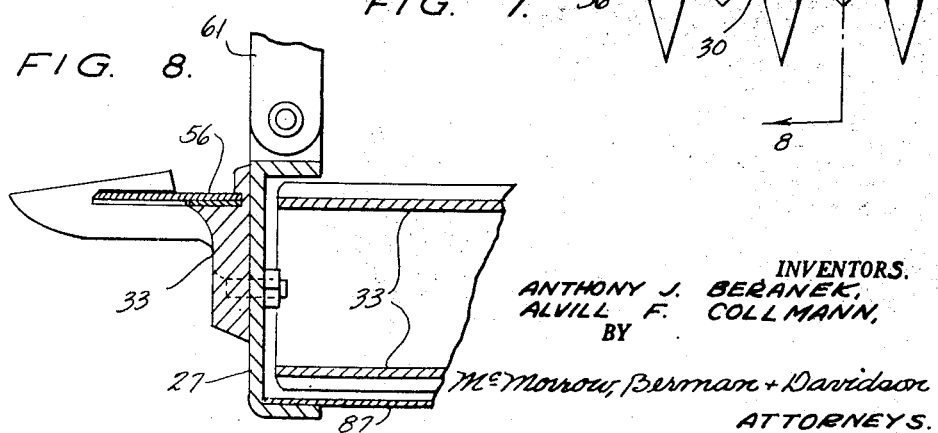
INVENTORS.
ANTHONY J. BERANEK,
ALVILL F. COLLMANN,
BY
McMorrow, Berman + Davidson
ATTORNEYS.

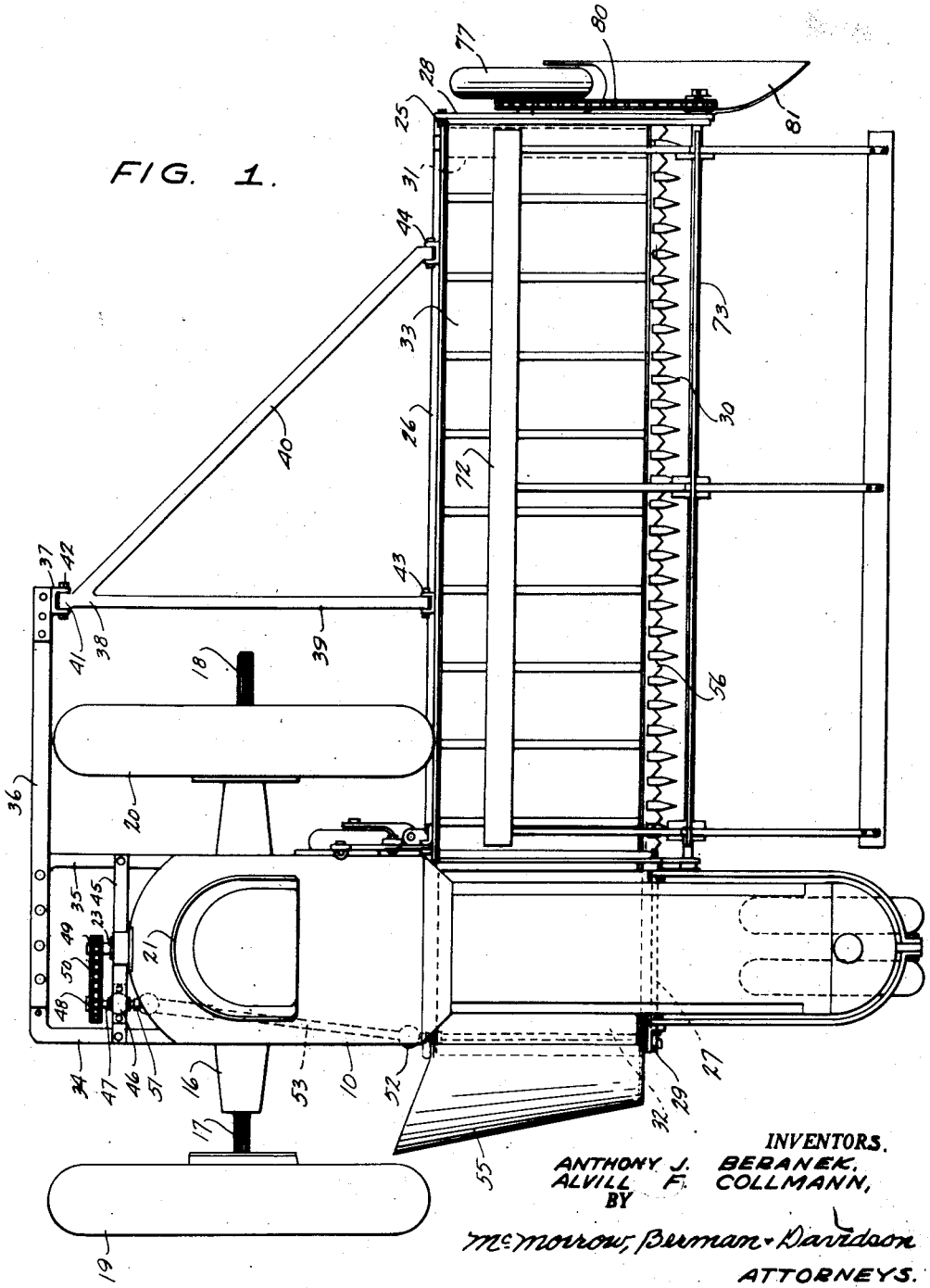

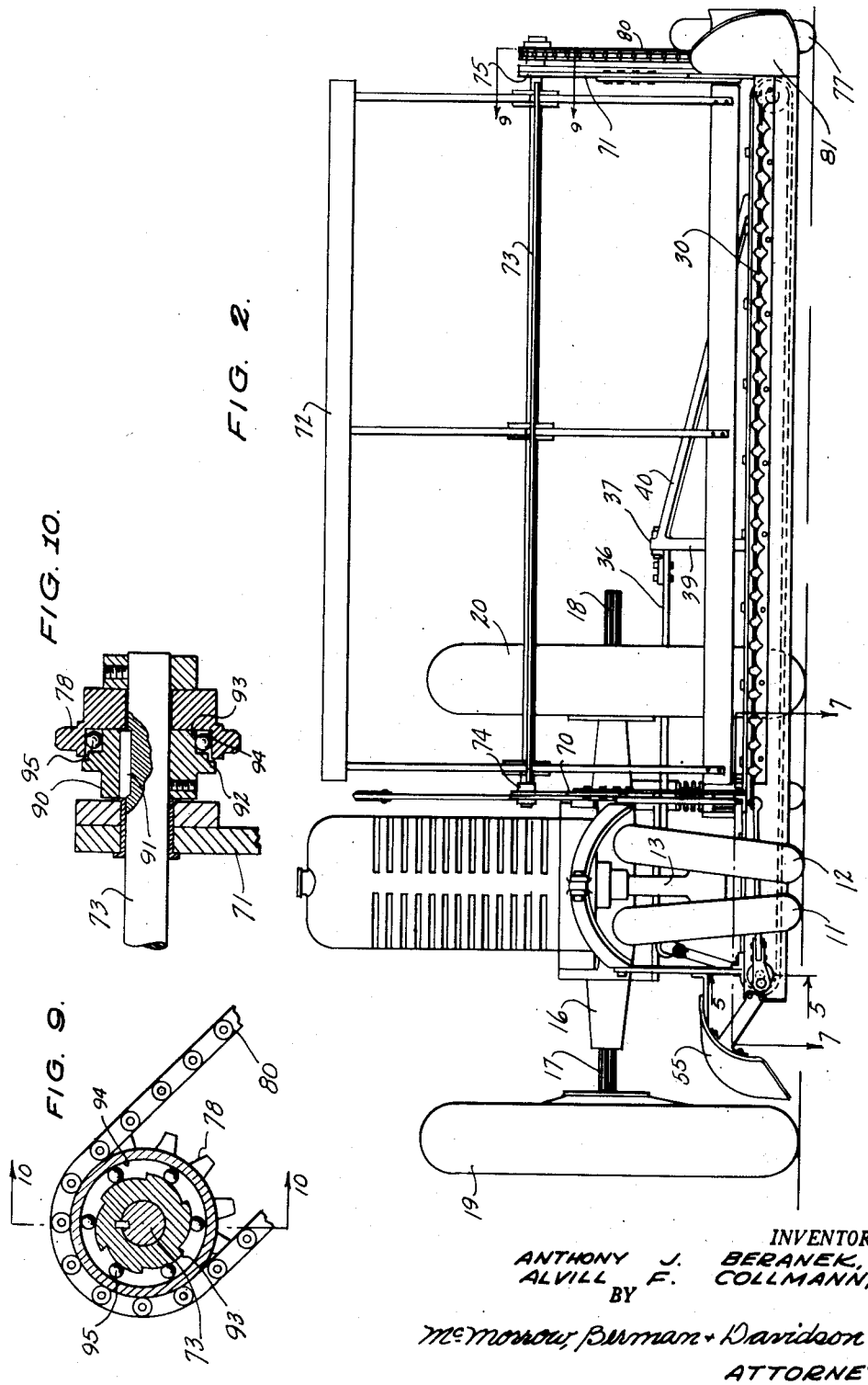

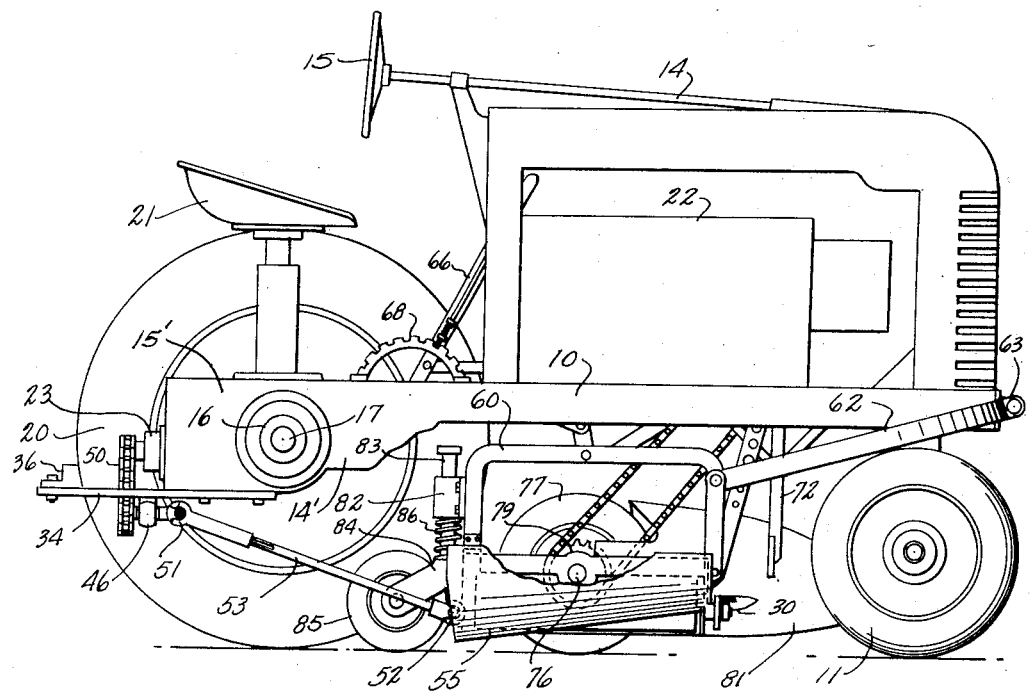

Patented Aug. 11, 1953

2,648,186

UNITED STATES PATENT OFFICE 2,648,186

TRACTOR-MOUNTED WINDROWER

Anthony J. Beranek and Alvill F. Collmann,
Coggon, Iowa

Application March 27, 1951, Serial No. 217,828

3 Claims. (Cl. 56—23)

This invention relates to agricultural implements for cutting and windrowing hay and similar material, and more particularly to a cutting and windrowing device adapted to be mounted directly on a farm tractor and driven thereby.

It is among the objects of the invention to provide an improved hay cutting and windrowing implement which can be mounted on a farm tractor so that one end of the implement is supported directly by the tractor and the tractor power take-off connection is drivingly connected to the implement at the tractor supported end of the latter; which is connected to the tractor so that the longitudinal center line of the implement is maintained substantially perpendicular to the longitudinal center line of the tractor; which has a reel driven from a ground wheel of the implement so that the speed of rotation of the reel is always proportional to the forward speed of the tractor and implement; which piles the windrow between the rear wheels of the tractor so that it is not necessary for the tractor wheels to run over the windrow at any time; which disposes the entire cutting portion of the implement within the vision of the operator of the tractor; which includes means for raising and lowering the sickle bar of the implement by the tractor operator while seated on the tractor; and which is simple and durable in construction, economical to manufacture and positive and effective in operation.

Other objects and advantages will become apparent from a consideration of the following description and appended claims in conjunction with the accompanying drawings, wherein:

Figure 1 is a top plan view of a tractor and implement combination illustrative of the invention;

Figure 2 is a front elevational view of the tractor and implement combination illustrated in Figure 1;

Figure 3 is a side elevational view of the tractor and implement combination looking at the side of the combination from which the implement projects, a portion being broken away and shown in cross-section to better illustrate the construction thereof;

Figure 4 is a side elevational view with parts broken away of the other side of the tractor and implement combination from that illustrated in Figure 3;

Figure 5 is a fragmentary cross-sectional view on an enlarged scale on the line 5—5 of Figure 2;

Figure 6 is a fragmentary perspective view on an enlarged scale of a bar and brace assembly which supports the implement in operative position relative to the tractor;

Figure 7 is a fragmentary cross-sectional view on an enlarged scale on the line 7—7 of Figure 2;

Figure 8 is a fragmentary cross-sectional view on an enlarged scale on the line 8—8 of Figure 7;

Figure 9 is a transverse cross-sectional view on an enlarged scale on line 9—9 of Figure 2; and Figure 10 is a cross-sectional view on the line 10—10 of Figure 9 with parts broken away.

With continued reference to the drawings, the tractor may be any one of various types of farm tractors, the tractor illustrated being of a form known as a row crop cultivating tractor. This tractor has an elongated frame 10 supported at its front end by a pair of steerable front wheels 11 and 12 which are disposed close together and journaled on oppositely projecting arbors at the lower end of a frame supporting and steering column 13 which is substantially vertically disposed at the front end of the tractor and connected through a steering shaft or column 14 with the tractor steering wheel 15. The rear end of the frame 10 includes the change speed transmission mechanism 14' and the differential mechanism 15' of the tractor, and a rear axle housing 16 from which the rear drive axles 17 and 18 project. Rear drive wheels 19 and 20 are mounted on the rear drive axles 17 and 18, respectively, and support the rear end of the tractor frame. It is to be noted that when the cutting and windrowing implement of the present invention is mounted on the tractor, the right rear wheel 19 of the tractor is spaced outwardly from the tractor frame further than the left rear wheel 20, and that the implement extends to the left-hand side of the tractor.

The tractor frame carries a driver's seat 21 disposed adjacent the steering wheel 15, the usual brake, clutch and throttle control levers, not illustrated, and an engine 22 mounted on the frame forwardly of the driver's seat 21. A power take-off connection 23 of well known construction is provided at the rear end of the tractor frame for supplying power to implements attached to the tractor.

The implement has a frame 25 of elongated, rectangular shape having a longitudinal rear edge constituted by a suitable structural member, such as the angle iron bar 26 and a front longitudinal edge which may be constituted by a similar angle iron bar 27. The frame also has end members 28 and 29 of suitable structural iron shapes connected at their ends to the corresponding ends of the longitudinal members 26 and 27 at the respectively opposite ends of the frame.

A sickle bar 30 of known construction is mounted on the front side member 27 of the frame and extends from the outer end member 28 to a location spaced from the other end of the frame a distance substantially equal to the width of the tractor frame 10.

The portion of the implement frame between the end of the sickle bar spaced from the corresponding end of the frame and the adjacent end of the frame is disposed below the tractor frame between the front and rear wheels of the tractor with the longitudinal center line of the implement frame substantially perpendicular to the longitudinal center line of the tractor frame.

Rollers 31 and 32 are disposed within the frame 25 and extend transversely thereof one at each end of the frame and these rollers are journaled at their opposite ends in the front and rear longitudinal side members of the frame. An endless conveyor belt 33 is trained over the rollers 31 and 32 and extends longitudinally of the frame for moving cut material from the end of the implement remote from the tractor to the end of the implement disposed beneath the tractor frame.

Two beams 34 and 35 extend rearwardly from the rear end of the tractor frame one at each side of the frame, and a bar 36 is connected to the rear ends of these beams and extends to the side of the tractor to which the implement frame 25 extends, this bar being substantially perpendicular to the longitudinal center line of the tractor frame and substantially parallel to the longitudinal center line of the implement frame, and terminates at its end remote from the tractor at a location spaced outwardly of the outer end of the rear drive axle 18 of the tractor. A hinge butt 37 is mounted on the bar 36 at the end of the bar remote from the tractor frame, and a V-shaped brace structure 38 having two legs 39 and 40 is provided at its apex with an eye 41 received between two spaced apart and apertured lugs of the hinge butt 37. A hinge pin 42 pivotally connects the brace structure to the hinge butt 37, and the legs 39 and 40 are pivotally connected at their other ends to the rear side member 26 of the implement frame by the hinge connections 43 and 44, respectively. The brace structure leg 39 is disposed substantially perpendicular to the rear side member 26 of the implement frame and to the bar 36, and the brace structure leg 40 inclines outwardly from the hinge butt 37 toward the outer end of the implement frame.

A cross member 45 extends between the beams 34 and 35 adjacent the rear end of the tractor frame and is secured at its ends to these beams. A bearing 46 is mounted on this cross member and a stub shaft 47 is journaled in this bearing and carries on one end a chain sprocket 48 drivingly connected to a chain sprocket 49 on the tractor power take-off connection 23 by a chain 50. A universal joint 51 is connected to the other end of the stub shaft 47, and a universal joint 52 is connected to the rear end of the roller 32. A variable length coupling shaft 53 connects the universal joints 51 and 52 so that the roller 32 is driven from the tractor power take-off connection 23 and drives the conveyor belt 33 in a direction to move such material to the end of the implement frame disposed beneath the tractor frame. A curved deflector plate 55 is secured to the implement frame at the end of the latter disposed beneath the tractor frame and has its lower edge spaced from the adjacent end of the implement frame so that material moved to this end of the implement by the conveyor belt 33 will pass downwardly between the deflector plate and the adjacent end of the conveyor belt and be deposited upon the ground at the inner side of the rear wheel 19 of the tractor.

A cutter bar 56 is disposed in the sickle bar 30 and the end of this sickle bar adjacent the roller 32 is connected to the roller by means which imparts reciprocatory movement to the cutter blade or bar upon rotation of the roller. This means includes a disc or crank arm 57 mounted on the end of the roller and disposed at the front side of the front frame member 27, and a pitman arm 58 is connected at one end to the adjacent end of the cutter bar 56 and at its other end to the disc or crank arm 57 eccentrically of the axis of rotation of the roller 32. Thus, the conveyor belt and the cutter bar are both driven simultaneously from the tractor power take-off connection through the mechanism connecting the rear end of the roller 32 to the power take-off connection, as described above.

A U-shaped bail 60 is secured at its open end to the implement frame 25 at the end of the implement frame disposed below the tractor frame, and this bail extends transversely of the implement frame and extends upwardly therefrom toward the tractor frame. A second U-shaped bail 61 is secured at its open end to the implement frame at a location spaced along the implement frame from the bail 60 a distance substantially equal to the width of the tractor frame, and this second bail 61 is also disposed transversely of the implement frame and extends upwardly therefrom, the bails 60 and 61 being disposed adjacent the respectively opposite sides of the tractor frame.

A U-shaped yoke 62 is pivotally secured at its midlength location to the front end of the tractor frame, as indicated at 63, and the legs of this yoke extend rearwardly along the tractor frame one at each opposite side thereof. The legs of the yoke 62 are pivotally connected at their rear ends to the bails 60 and 61 at the upper ends of the front legs of these bails, and the yoke and bails provide a pulling connection between the tractor and the implement.

A bell crank lever 64 is pivotally mounted at its angle on the tractor frame at a location substantially directly above the rear side of the implement frame, and one end of this bell crank lever is connected to the upper portion of the bail 61 by a pivoted link 65. A hand lever 66 is pivotally mounted at one end on the tractor frame rearwardly of the bell crank lever 64 and is connected at a location intermediate its length to the other end of the bell crank lever 64 by a pivoted link 67. With this arrangement, movement of the hand lever 66 forwardly and rearwardly will tilt the implement frame to raise and lower the sickle bar 30. A toothed quadrant 68 is mounted on the tractor frame concentric with the axis of pivotal mounting of the hand lever 66, and the hand lever is provided with a manually operative detent of known construction engageable with the teeth of the quadrant 68 to releasably lock the lever in selected positions of adjustment so that the sickle bar of the implement will be supported at elevations selected by the operator of the tractor.

An adjustable length reel supporting standard 70 is mounted on the bail 61 and extends upwardly and forwardly of the front side of the implement frame 25. A similar reel supporting standard 71 is mounted on the frame at the end of the frame remote from the tractor, and a reel 72 has the ends of its axle 73 journaled in bearings 74 and 75 carried by these standards at the upper ends thereof.

A stub axle 76 is secured at one end to the outer end member 28 of the implement frame adjacent the rear side member 26 of the frame, and a ground wheel 77 is journaled on the stub axle and disposed at the outer side of the adjacent end member of the frame.

A chain sprocket 78 is secured on the reel axle at the outer side of the standard 71, a chain sprocket 79 is secured to the ground wheel 77 at the inner side of the ground wheel, and a chain 80 extends around the sprockets 78 and 79 and drivingly connect the ground wheel to the reel so that the reel is rotated by the ground wheel in proportion to the speed of forward movement of the tractor and implement assembly.

A one-way drive clutch is interposed between the sprocket 78 and the shaft 73 so that the reel can continue to rotate under its own momentum when the ground wheel 77 is slowed down or stopped. While this clutch may be any one of several known mechanical forms, in the arrangement illustrated, an inner clutch element 90 in the form of a tubular sleeve is mounted on the shaft 73 and connected to the shaft against rotation relative thereto by a key 91 received in complementary keyways in the shaft and the clutch element. This clutch element has an external annular collar or flange 92 thereon and at one side of this flange a cam formation 93 having a circumferential series of raidally inclined cams. The sprocket 78 is provided with a recess 94 of cylindrical shape receiving the cam formation 93 and has one end contiguous to flange 92 to enclose the space within the recess. Clutch elements in the form of balls or rollers 95 are disposed between the several cams of the cam formation and the circumferential surface of the recess 94 to provide a one-way drive between the sprocket 78 and the shaft 73.

A hollow divider 81 is secured to the frame at the other end thereof and receives the front portion of the ground wheel 77 to separate the grain to be cut by the sickle bar from the grain to be left standing alongside the swath.

A bearing block 82 is mounted on the rear leg of the bail 60 and has a substantially vertically disposed bore or opening. The stem 83 of a caster wheel fork 84 is slidably and rotatably received in the bearing block 82 and a ground-engaging wheel 85 is journaled between the arms of the fork below the bearing block 82. A compression spring 86 surrounds the stem between the bifurcated portion of the fork and the bottom end of the bearing block 82 to resiliently support the load of the implement frame on the caster wheel. This caster wheel is disposed at the rear side of the implement frame and adjacent the side of the tractor from which the implement extends, and provides a fulcrum for the raising of the sickle bar 30 by the hand lever 66, as well as supporting the end of the implement frame adjacent the tractor.

A bottom platform 87 is attached to the bottom edges of the side and end members of the frame and extends over the area of the bottom of the implement frame to protect the conveyor belt 33 and support the bottom flight of the conveyor belt above the bottom edge of the implement frame.

This combination provides a compact arrangement which is easy to maneuver and can be turned around sharp corners of the standing hay or grain, because of the positioning of the sickle bar between the front and rear wheels of the tractor, and which also places the entire swathing or cutting portion of the implement in the full view of the operator of the tractor.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a tractor having a frame, steerable front wheels supporting the front end of said frame, rear drive wheels supporting the rear end of said frame, and a power take-off connection at the rear end of the tractor, a cutting and windrowing implement comprising a frame of elongated rectangular shape having a front longitudinal side and a rear longitudinal side, a sickle bar extending along the front side of the implement frame and terminating short of one end of the latter, rollers extending transversely of said frame one at each end thereof and journaled at their ends on said frame, an endless conveyor belt trained over said rollers and extending longitudinally of said frame, said one end of said implement frame being disposed below said tractor frame between the front and rear wheels of the tractor, bails secured at their open ends to said implement frame and disposed transversely thereof one at said one end of the implement frame and the other spaced along said implement frame from said one end a distance such that said bails extend upwardly from said implement frame at respectively opposite sides of said tractor frame, a U-shaped yoke pivotally secured at its mid-length location to the front end of said tractor and having its legs extending rearwardly of the tractor at respectively opposite sides of the latter, said legs being pivotally connected at their rear ends one to each of said bails at the upper ends of the front legs of the bails, said yoke and said bails providing a traction connection between the tractor and the implement, a bell crank lever pivotally mounted on said tractor frame and connected at one end to one of said bails, a hand lever pivotally mounted on said tractor frame and connected to the other end of said bell crank lever for raising and lowering said sickle bar, a ground wheel journaled on said implement frame at the other end of the frame and disposed adjacent the rear side of the frame, a ground-engaging caster wheel secured to said implement frame at the rear side of the frame and adjacent the side of the tractor from which the implement extends, reel supporting standards secured to said implement frame and projecting upwardly therefrom one at each end of said sickle bar, a reel journaled at its ends in said standards at the upper ends of the latter, means drivingly connecting said ground wheel to said reel, a cutter blade disposed in said sickle bar, pitman means connecting the front end of the roller at said one end of said implement frame to the adjacent end of said cutter bar for imparting reciprocatory movement to the cutter bar upon rotation of said roller, means drivingly connecting said tractor power take-off connection to the rear end of said roller for driving said conveyor belt and said cutter bar from said tractor power take-off connection, a bar connected to the rear end of said tractor frame and extending transversely of the latter to a location rearwardly of said implement, and a brace structure pivotally connected between said bar and the rear side of said implement frame to maintain the longitudinal center line of said implement frame substantially perpendicular to the longitudinal center line of said tractor frame.

2. In combination with a tractor having an elongated frame, steerable front wheels supporting the front end of said frame and rear drive wheels supporting the rear end of said frame, and an implement having a frame of elongated rectangular shape one end of which is disposed below said tractor frame between said front and rear wheels and intermediate the width of the tractor and the other end of which is spaced from one side of the tractor, and ground wheels connected to the implement frame one at each end thereof, means connecting the tractor frame to said implement frame comprising bails connected at their open ends to said implement frame and extending transversely of and upwardly from said implement frame one at each side of said tractor frame, and a U-shaped yoke having its intermediate portion pivotally connected to said tractor frame at the front end of the latter and its legs extending rearwardly from said intermediate portion one at each side of said tractor frame and pivotally connected at their ends remote from said intermediate portion one to each of said bails.

3. In combination with a tractor having an elongated frame, steerable front wheels supporting the front end of said frame and rear drive wheels supporting the rear end of said frame, and an implement having a frame of elongated rectangular shape one end of which is disposed below said tractor frame between said front and rear wheels and intermediate the width of the tractor and the other end of which is spaced from one side of the tractor, and ground wheels connected to the implement frame one at each end thereof, means connecting the tractor frame to said implement frame comprising bails connected at their open ends to said implement frame and extending transversely of and upwardly from said implement frame one at each side of said tractor frame, a U-shaped yoke having its intermediate portion pivotally connected to said tractor frame at the front end of the latter and its legs extending rearwardly from said intermediate portion one at each side of said tractor frame and pivotally connected at their ends remote from said intermediate portion one to each of said bails, and a brace structure pivotally connected between the rear end of said tractor frame and the rear side of said implement frame maintaining said implement frame in position relative to said tractor frame with the longitudinal center line of said implement frame substantially perpendicular to the longitudinal center line of said tractor frame.

ANTHONY J. BERANEK.
ALVILL F. COLLMANN.

References Cited in the file of this patent
UNITED STATES PATENTS

| Number | Name | Date |
|---|---|---|
| 1,251,265 | Millican et al. | Dec. 25, 1917 |
| 1,533,359 | White | Apr. 14, 1925 |
| 1,917,352 | Apel | July 11, 1933 |
| 2,354,962 | Oehler et al. | Aug. 1, 1944 |
| 2,480,777 | Schwartz | Aug. 30, 1949 |